Jan. 30, 1951     F. HAGUE     2,539,663
VEHICLE TANK CONSTRUCTION FOR FILLING AND DISPENSING
Filed April 10, 1945
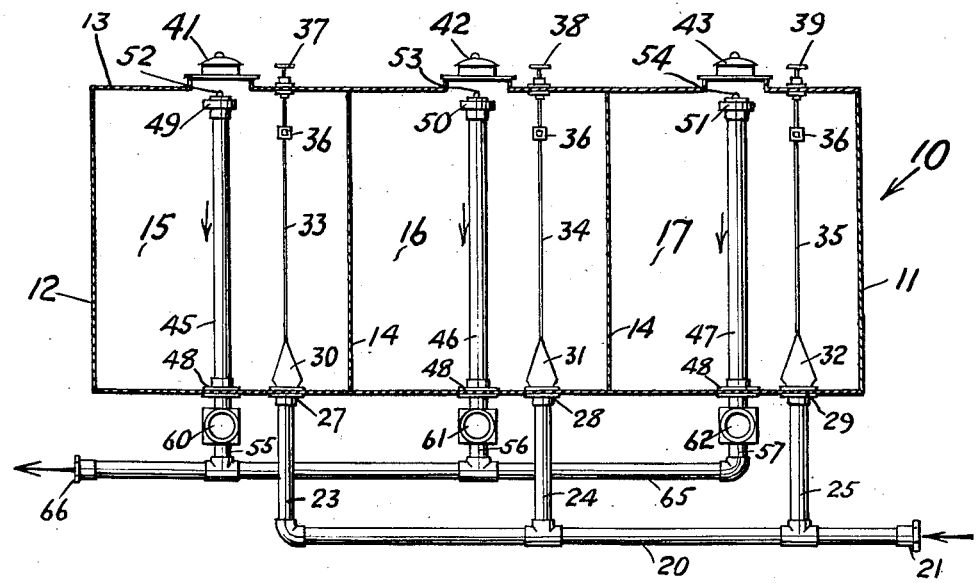
WITNESS:
INVENTOR
Fred Hague
BY
ATTORNEYS.

Patented Jan. 30, 1951

2,539,663

UNITED STATES PATENT OFFICE 2,539,663

VEHICLE TANK CONSTRUCTION FOR FILLING AND DISPENSING

Fred Hague, Devon, Pa., assignor to Sun Oil Company, Philadelphia, Pa., a corporation of New Jersey Application April 10, 1945, Serial No. 587,471

1 Claim. (Cl. 137—21)

This invention relates to a system and apparatus for filling a compartmented receptacle, and relates more particularly to the body of a cargo vehicle adapted to transport liquids, such as gasoline, oil, kerosene, or other volatile fluids, and an apparatus in combination therewith for filling each of the compartments with a predetermined or measured quantity of fluid.

An object of the invention is to provide a system or method of filling a plurality of compartments of a vehicled tank simultaneously so as to assure the filling of each compartment to its maximum measured capacity.

Another object of the invention is to provide, in combination with a cargo vehicle tank, apparatus which will enable each of the compartments to be filled with fluid to their measured maximum capacity.

Another object of the invention is to provide an apparatus for filling a vehicled compartmented tank which eliminates the necessity of opening the dome caps or covers of the tank during the filling operation.

Another object of the invention is to enable compartments of a cargo tank to be filled to their maximum capacity in a more efficient and safe manner than heretofore known.

Still another object of the invention is to enable the compartments of a gasoline cargo truck to be filled to a measured capacity in a manner wherein any possibility of the gasoline overflowing therefrom or otherwise spilling from the tank is eliminated.

Another object of the invention is to provide visual indicating means for determining, during the filling operation, when each of the various compartments of a gasoline cargo truck is filled so that the supply of gasoline to the various compartments may be shut off after the compartments are filled.

Still another object of the invention is to provide a gasoline transporting truck which may be driven to a loading position relative to gasoline storage tanks or the like, after which only two simple conduit connections are made to the tank to enable filling of each compartment within the tank simultaneously.

Still another object of the invention is to eliminate the waste of gasoline during the filling operation of a gasoline cargo truck commonly caused by spilling or overloading, and thereby eliminate the hazards of fire and explosion often caused by such spilling.

The drawings are a schematic view of the invention, showing only the tank, compartments therein and the apparatus in combination therewith which forms the subject of the present invention.

The general arrangement of the invention resides in a tank having a plurality of compartments therein, wherein each of the compartments is filled to a measured maximum capacity simultaneously by means of a filling manifold, the filling manifold having conduits branching off therefrom leading directly to the compartments. As shown in the drawings, it is preferred to fill the compartments from the bottom and, in such event, the filling manifold and conduits branching off therefrom are positioned below the tank. A valve is provided, preferably within each compartment, for controlling the supply of fluid from the filling manifold and conduits to the tank. A valve actuating handle is provided for each supply valve to open and close the same, the handle being positioned outside of the tank for easy access thereto. A vertically extending overflow pipe is positioned within each compartment, preferably aligned with the dome caps of the tank. The overflow pipes extend from the bottom of the tank upwardly to a point adjacent the top thereof, and each overflow pipe is provided with a suitable valve, access to the valve being had through the dome caps. An overflow extension is preferably axially aligned and is in communication with each overflow pipe and these overflow extensions depend from the bottom of the tank. An overflow manifold is positioned on the underside of the tank and is in communication with each of the overflow extensions so that the overflow of fluid from each of the compartments drains by gravity into a single overflow manifold. Suitable sight gauges are positioned in each of the overflow extensions so as to indicate to an operator positioned at the ground level when the desired liquid level in the compartments is attained. The filling manifold and overflow manifold are each provided with suitable couplings adjacent their free ends to enable easy attachment to a fluid supply source and an overflow storage tank.

Referring now in detail to the single figure of the drawings which illustrates my improved vehicle tank construction in sectional elevation, reference numeral 10 generally indicates the tank of a gasoline truck, the tank 10 being mounted upon the chassis of the truck or other suitable suspension arrangement (not shown) in any suitable manner. The tank 10 may be considered to be elliptical in cross section and formed of end walls 11 and 12 which are connected by elliptical shell 13. A plurality of partitions 14 divide the tank 10 into a plurality of compartments 15, 16 and 17, as shown. The tank 10 may, of course, take any desired shape and the compartments formed therein may be of different capacities.

A filling manifold is indicated at 20, and is provided with a suitable coupling 21 adjacent one end for connection to a source of supply and lengthwise thereof are a plurality of branch conduits 23, 24 and 25 for filling the respective compartments. The branch conduit or pipe 23 extends upwardly and is permanently secured to the underside of the elliptical shell 13 by a coupling 27 to be in communication with the compartment through an aperture in the shell 13. The conduits 24 and 25 are also secured to the underside of the shell 13 by couplings 28 and 29 to be in communication with compartments 16 and 17 respectively. Thus, fluid communication is provided from manifold 20 into each of the compartments of the tank 10. Suitable supply valves 30, 31 and 32 are positioned within compartments 15, 16 and 17 respectively, and control the delivery of fluid from the filling manifold 20 to the respective compartments. The supply valves 30, 31 and 32 may be actuated by any desirable means but, as indicated, actuating rods 33, 34 and 35 are used which extend upwardly of the compartments being secured at 36 to handles or fulcrum type levers 37, 38 and 39. These handles are positioned beyond the top wall 13 of the tank 10 preferably adjacent to the dome covers 41, 42 and 43, and may be operated by hand or if preferred, they may be operated at ground level by a cable control located below the top of the tank. Assuming that the capacity of the compartments 15, 16 and 17 vary, or that constructional arrangements demand such procedure, it may be preferred to vary the diameter of the filling conduits 23, 24 and 25 accordingly, so that each compartment will be filled to capacity substantially simultaneously. However, this function may be accomplished by varying the capacity of the supply valves 30, 31 and 32, if desired.

Overflow pipes 45, 46 and 47 are positioned within the compartments 15, 16 and 17 respectively and each extends vertically of its compartment with its lower end secured in an aperture in the bottom of shell 13 by means of a coupling 48, as shown, and its upper open end positioned adjacent the top of the compartment. Suitable valves 49, 50 and 51 are provided respectively for the open end of pipes 45, 46 and 47 and actuating handles 52, 53 and 54 or other means, mechanically or hydraulically operated, may be used for actuating the overflow valves. Overflow extensions 55, 56 and 57 are aligned respectively with the overflow pipes 45, 46 and 47 by the sealing couplings 48. Sight gauges 60, 61 and 62 are fitted to the overflow extensions 55, 56 and 57 respectively in order to visually indicate the flow of fluid from the overflow pipes. An overflow manifold 65 is placed in communication with the lower end of each of the overflow extensions to drain the fluid therefrom and a suitable coupling 66 is secured adjacent the open end of the overflow manifold 65 for connection to a disposal receptacle.

In operation, the truck (not shown) is driven to a loading position relative to storage tanks (not shown). A hose or the like from a storage source is connected to the filling manifold 20 through coupling 21. Thereafter, the overflow manifold 65 is connected to an overflow storage chamber. It will be understood, of course, that if the storage tanks are above ground fluid will flow into the filling manifold 20 by gravity and the overflow fluid from overflow manifold 65 would flow to a storage tank placed on or below the ground by gravity. On the other hand, if the storage tanks are positioned underneath the ground, fluid will be pumped therefrom into the filling manifold 20, and in such event, the fluid from the overflow manifold 65 may drain back into the storage tank. The overflow valves 49, 50 and 51 are then actuated to the open position as are also the supply valves 30, 31 and 32. After these valves are opened liquid is admitted through the coupling 21 into manifold 20 and thence in the direction of the arrows and upwardly into the filling conduits or pipes 23, 24 and 25 and thus into each of the compartments 15, 16 and 17. Dome caps 41, 42 and 43 are suitably vented for pressure and vacuum so that unless desired it will not be necessary to open them during filling or dispensing operations. The flow of fluid into the compartments continues until the fluid rises to substantially the top of each compartment. After the fluid rises above each of the overflow valves 49, 50 and 51, fluid will then overflow through the valves into the overflow pipes 45, 46 and 47, and through the sight gauges 60, 61 and 62 respectively. Assuming now that compartment 15 is the smallest compartment, the same may be filled a little sooner than the other compartments and fluid would then be seen in sight gauge 60, thus indicating to the operator that compartment 15 has been filled to capacity. Valve 30 is then closed to prevent additional fluid from entering this compartment and, also, to prevent fluid from draining by that valve from said compartment when the pressure has been relieved from the filling manifold 20. If compartment 17 is intermediate in capacity, fluid would next be seen in sight gauge 62 thus indicating that compartment 17 has been filled. Thereupon, the operator closes valve 32 to prevent additional fluid from being supplied to the compartment and, likewise preventing the fluid from leaving the compartment. Soon thereafter, fluid will be seen in sight gauge 61, indicating that compartment 16 has been filled, after which the valve 31 would be closed. The fluid draining through the overflow extensions 55, 56 and 57 will drain into the overflow manifold 65 by gravity and then to storage tank (not shown). Thereafter, the pressure from the source of supply would be cut off, after which the couplings 21 and 66 may be actuated to uncouple the tank 10 from the storage tanks. Overflow valves 49, 50 and 51 are then closed through their actuating handles or mechanisms 52, 53 and 54 respectively, so as to prevent any spilling of the fluid into or through the overflow pipes when the vehicle is in motion, thus maintaining a correct and predetermined liquid level in each and all compartments. After the overflow valves have been properly closed the vehicle is then ready to transport its liquid load.

While the filling manifold and conduits have been illustrated and described as being positioned on the underside of the compartments, it will be understood, of course, that the filling manifold may be positioned elsewhere, such as on top of the tank or on either side thereof since the broad feature of the invention is to indicate to an operator when a tank or compartment thereof is filled to the desired extent without the necessity of his checking the liquid level. It is an essential feature of the invention, however, that the sight gauges or visual indicating means be positioned at the bottom of the tank so that an operator can readily determine from the ground level when the tank or compartments thereof are properly filled.

What I claim and desire to protect by Letters Patent is:

A liquid dispensing apparatus adapted for moving vehicles which comprises an enclosed tank body, partitions extending across the tank body providing a plurality of independent compartments therein of substantially equal volume, an inlet manifold beneath said tank body for supplying liquid to all the compartments simultaneously, an outlet manifold positioned beneath said tank body in spaced relation therewith, an overflow conduit in each compartment, the upper ends of the overflow conduits being positioned at substantially the same level and in slightly spaced relation with the top of each compartment, and the lower end of each of the overflow conduits opening through the bottom of the respective compartments, a connecting conduit between the lower end of each overflow conduit and said outlet manifold, means on each of said connecting conduits for indicating flow of liquid therethrough when each compartment is substantially filled and independent valve means between the inlet manifold and each compartment for cutting off the supply of liquid to each compartment when liquid flows therefrom through its overflow conduit.

FRED HAGUE.

REFERENCES CITED

The following references are of record in the file of this patent:

UNITED STATES PATENTS

| Number | Name | Date |
|---|---|---|
| 478,977 | Bailey | July 19, 1892 |
| 1,109,768 | Lanx | Sept. 8, 1914 |
| 1,124,329 | Rhodes | Jan. 12, 1915 |
| 1,233,898 | Miller | July 17, 1917 |
| 1,408,557 | Yarrington | Mar. 7, 1922 |
| 1,509,535 | Wertz | Sept. 23, 1924 |
| 1,540,684 | Eades | June 2, 1925 |
| 1,755,153 | Shield | Apr. 15, 1930 |
| 1,949,364 | Ball | Feb. 27, 1934 |
| 2,301,821 | Scott | Nov. 10, 1942 |
| 2,384,628 | Krone | Sept. 11, 1945 |